Dec. 19, 1961 P. W. WESTBURG 3,013,748
AIRCRAFT FLAP SUPPORTING AND OPERATING MECHANISM
Filed March 11, 1959 4 Sheets-Sheet 1

INVENTOR.
PETER W. WESTBURG
BY
Edwin Coates
ATTORNEY.

INVENTOR.
PETER W. WESTBURG
BY Edwin Coates
ATTORNEY.

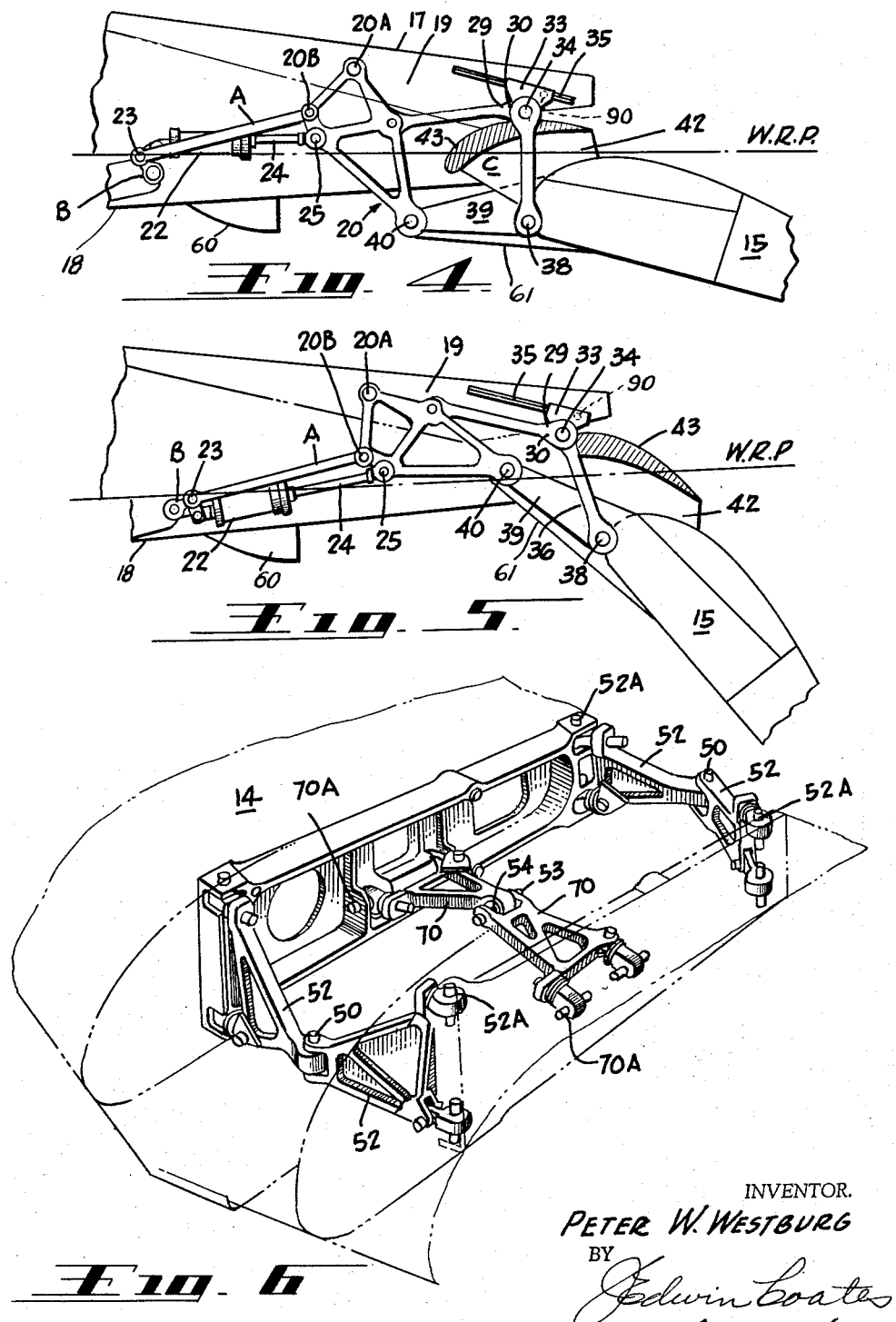

Dec. 19, 1961 P. W. WESTBURG 3,013,748
AIRCRAFT FLAP SUPPORTING AND OPERATING MECHANISM
Filed March 11, 1959 4 Sheets-Sheet 4

INVENTOR.
PETER W. WESTBURG
BY
Edwin Coates
ATTORNEY.

United States Patent Office 3,013,748
Patented Dec. 19, 1961

3,013,748
AIRCRAFT FLAP SUPPORTING AND OPERATING
MECHANISM
Peter W. Westburg, Tulsa, Okla., assignor to Douglas Aircraft Company, Inc., Santa Monica, Calif.
Filed Mar. 11, 1959, Ser. No. 798,721
5 Claims. (Cl. 244—42)

The present invention relates in general to aircraft wings and more particularly to improvements in mechanisms for mounting and operating flaps in relation to the trailing edge of the wings.

The function of trailing edge flaps in varying the lift and drag characteristics of the main wing is well known in the art. Generally, these flaps, in their fully retracted position, form a smooth continuation of the upper and lower surfaces of the main wing and also provide a substantial portion of the trailing edge area of the wing. In order to produce the different aerodynamic, or lift-drag conditions necessary for proper take-off and landing of the aircraft, it is necessary that the flaps be moved from the retracted position to positions which are simultaneously rearward and downward in relation to the fixed wing so that the flap is, at certain times, at certain angles to a reference plane in the wing. The mechanism that connects and supports the flaps to the wing and effectuates the required movements of the flaps must be capable of withstanding a wide range of aerodynamic loads and at the same time must be compact, so as to fit within the wing structure, when retracted, with the minimum of external drag-producing, no-lift protuberances. The latter requirement has become particularly important with the advent of high speed aircraft which are characterized, among other things, by wings of extremely thin cross section.

The present invention is directed to novel mounting, or supporting, and operating mechanism, and novel arrangements thereof, for trailing edge flaps of the full displacement type, which mechanism is so configured that it accomplishes the foregoing and other objectives. The present improved flap supporting, mounting and operating construction utilizes, in combination with suitable powering means controllable by the pilot, several articulated multi-link linkages, each linkage-system having a novel support-point in the wing and each being connected to the forward portion of the flap. The mechanism is so organized that these support points are translatable, back and forth, in the chordwise direction of the wing during both protraction and retraction. While fully enabling proper rearward and forward translation of the flap-unit and rotational movement thereof at the proper juncture, this feature of the invention minimizes the necessary lengths of the individual links of the total linkage and permits full rearward translation of the flap before full deflection thereof. It is understood that previous flap supporting and operating linkages of this type have no such novel support point as all had fixed support points for the linkage-unit, which fact, among other things, necessitated undesirably lengthy links and required high operating power. It is to be observed that the present flap system can withstand and operate under significantly higher air-loadings than previous, unimproved such flaps, yet requires no strengthening auxiliaries that invariably would result in drag-producing protuberances from the high-speed, thin-section wings with which this invention is particularly concerned. The flap can also be substantially fully protracted or rearwardly displaced, without undergoing appreciable deflection.

Other concepts and novelties of the invention will either be made manifest or become apparent as this disclosure proceeds.

Chiefly in order to render the inventive concepts more concrete, the presently-preferred embodiment thereof is illustrated in the accompanying drawings and is described, part-by-part, hereinafter, in conjunction with said drawings. However, it is to be understood that these drawings and this description by no means limit the scope of the invention to their specificities, the ambit of the invention being that which is defined in the sub-joined claims.

In these drawings,

FIG. 4 is a diagrammatic elevational view of the flap linkage with the flap at 20° with reference to the wing reference plane, this view representing the flap in a partially extended position typical of the take-off configuration;

FIG. 5 is a similar view of the linkage and flap with the components in an attitude typical of those used for landing, and in which the flap can be depressed to as low as a 50° deflected position with reference to the wing reference plane;

FIG. 6 is a perspective view, partly in phantom, of the junction region of the inboard and outboard flap-segments, showing the pivotal interconnections and arrangement that enables the relatively angled inboard and outboard flaps to be lowered simultaneously without mutual interference and, instead, to overlap;

Figure 7:
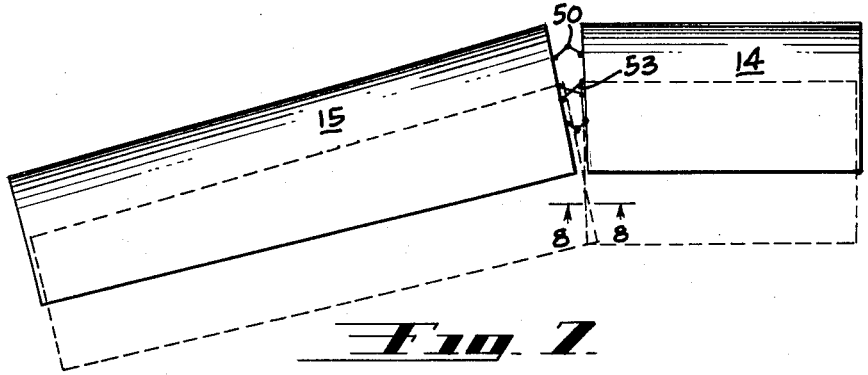
Figure 8:
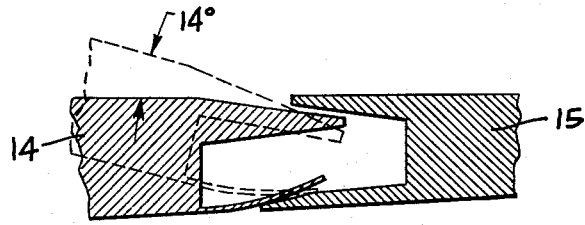

FIG. 7 is a top plan view of the inboard and outboard flaps and their pivotal interconnecting mechanism, the solid lines representing the flaps in their retracted position and the dotted lines showing them in their protracted position; and FIG. 8 is a fragmentary sectional view on line 8—8 of FIG. 7, showing that upon protraction these flaps also assume a lateral dihedral angle with respect to each other as well as an overlapping condition.

Referring now, part-by-part, to the constructions and configurations shown in the drawings, the invention is illustratively incorporated in a high-speed, jet-propelled transport airplane having a fuselage 12 and sweptback wings 13 which are of rather thin cross-sectional dimensions, or airfoil section average, to obtain the best all-around performance at speeds just slightly below transsonic.

Each wing-half incorporates an inboard flap-portion or segment, 14 and an outboard one, 15. All these flaps are of the "full-through airfoil-section, trailing edge hung" type and are, although of thin section, so configured as to prevent separation from the flaps of the boundary layer with consequent burbling, and to, instead, maintain the airflow thereover "smooth," continuous and effective even when the flap is at its maximum 50° of downward deflection.

Each wing-half has, of course, an upper surface 17 and a lower one, 18. Attached to 17 in chordwise position near the open rear edge, or well, of the wing is a bracket 19, at each of the locations, D, shown in FIG. 1. Each bracket 19 both supports a rather massive, first order lever 20 constituting the largest member of the linkage system being discussed, pivoted only at 20A, and bearing several lightening holes, as shown, and member 20, by means later described, helps carry one of the flaps 14 and 15, although the inboard mounting-means of the inboard flaps 14 and the outboard mounting means of the outboard flaps 15 are not powered to operate the flap but serve merely as a suspending anchorage and carrying means.

All the flap operating parts, except the aforementioned suspensory or fulcruming parts or points, are constituted by a hydraulically protractable and retractable linkage-system. This system, first, consists of the links 20, 33, 36 and 27 which are, with horn 39, essentially quadrilateral in arrangement. The fixed bracket 19 "suspends" 20, and 33; and 33 "suspends" 36, links 27 and 39 connecting 36 and 20.

This mechanical system hence can be considered as a six-bar linkage system, although 39, and 19 are not of themselves pivotally mounted.

The main support or anchorage for the present flap actuating mechanism is the bracket 19 which is substantially of inverted channel-shape and is attached to the inner face of the upper surface of the wing in the well that contains the linkage and receives the flap-group.

Figure 2:
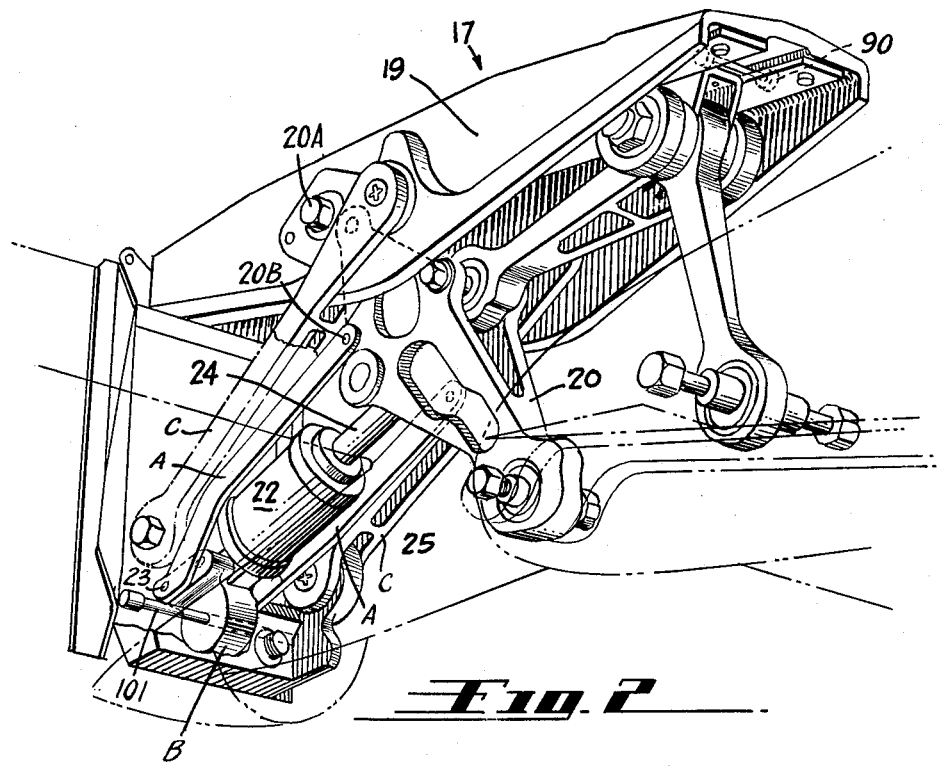
FIG. 2 is an isometric view of one of the power actuated flap linkages.

Between the sides of the channel-shaped fixed member 19, as shown in FIG. 2, and at the upper end portion of lever 20, pivotal mountings therefor, as shown, are provided. Lever 20 includes four other pivotal points to which links are mounted. Reading counterclockwise, these points or pivots are 20A, 20B, 25, 40 and 28.

An actuator 22, in the form of a hydraulically powered piston-and-cylinder arrangement, has its one end connected, as shown in FIG. 2, to the normally rearwardly extending arm of a bell crank, B, the vertical arm of B being pivotally fixed to adjacent structure in the wing. The piston rod end of the actuator is pivotally connected at 25 to the large lever 20. The goose-neck of the actuator is pivotally connected to rearwardly extending arm of B. To accommodate the swinging of the hydraulic actuator in the vertical plane, as well as to take care of its expansion and contraction in action, a pair of auxiliary rods A, one on each side of the actuator, is pivoted at one end to lever 20 at point 20B, the other end of each rod A being pivotally connected at 23 to the forward end of the rearwardly extending arm of B. Point 20B lies off-center with respect to 20A. Reinforcing arms C are also provided.

To the one edge of lever 20, substantially medially thereof, there is pivoted one end of a push-pull rod or link 30. The opposite end of 30 is pivoted at 29 at an ear or lug, not shown, on a slider block 33 carrying a roller 90 for running in the guideway 35. Block or carriage 33 is also pivoted to at 34 to a link 36 and by means of the roller 90 and lateral flanges shown in FIG. 2, constituting a track 35, translates on 19, being thereby adapted to slide back and forth in the protraction and retraction of the flap. Thereby, the lengths necessary to provide for the proper action of links 30 and 36, and hence the vertical shifting of their point of mutual connection, is so greatly reduced over that heretofore necessary that, for the first time in this art an advantageous quadrilateral linkage may be employed in even the quite thin wings essential for use in high-speed aircraft.

Figure 3:
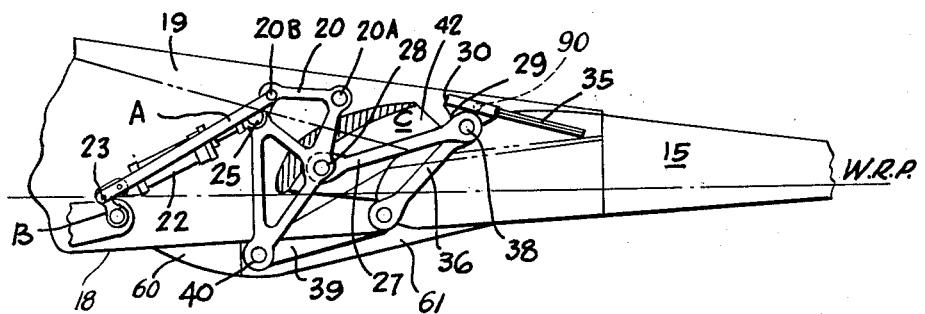
FIG. 3 is a diagrammatic elevational view of the flap linkage per see, with the flap lying at 0° displacement with reference to the wing reference plane, this view representing the flap in a retracted position wherein the upper surface of the flap is in smooth continuity with the upper rearward surface of the wing.

As shown in FIG. 3, track 35 is inclined rearwardly and downwardly to take care of the downward and rearward displacement of the flap.

Numeral 90 represents the shaft and roller unit for affording movement of the carriage 33 in the track 35. 90 extends transversely between the side walls of the carriage 33 and has rollers at opposite ends running in the track. Numeral 101 represents a shaft or fixed axle for pivotally anchoring the lower link of the bell-crank B.

The flap itself is of "full-through" airfoil section and fixedly carries, at its forward upper portion, a vane or slat 43, substantially as, and for the purposes of, the well-known Handley-Page slot-and-slat combination. The slat is attached to the flap by a bracket C and therewith defines a slot 42.

The link 36 has its lower end pivoted to the flap at 38. The flap also includes a horn 39 pivoted at 40 to the lower end of lever 20.

Figure 1:
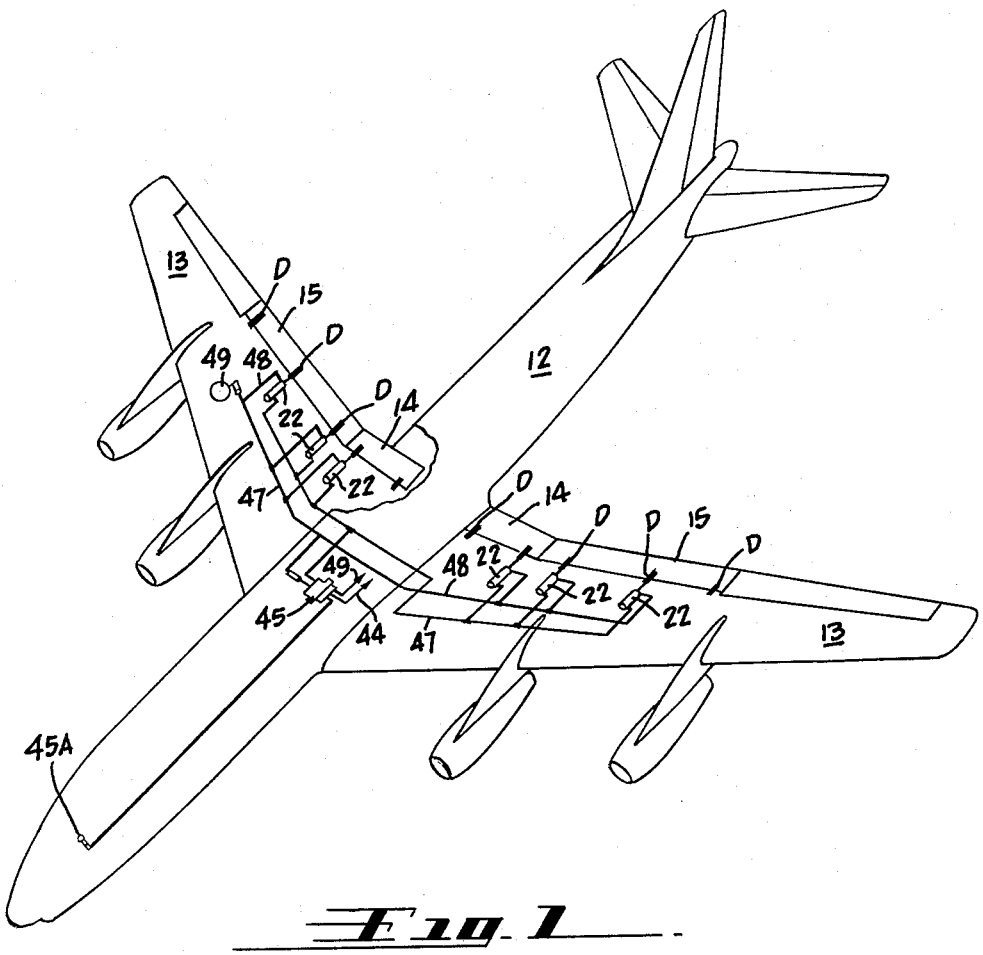
FIG. 1 is a view of an aircraft with swept back wings, showing the relative location of the flaps and their attaching linkages to the body of the wing and including a schematic diagram of the hydraulic actuating system for these linkages.

As diagrammed in FIG. 1, the hydraulic powering system for the six "live" mountings for the flaps (the other four mountings, D, being mere suspensions or pivots for the flaps) comprises a flow-and-return conduit-path 44 for pressurized fluid from and to a source thereof, not shown; a control valve 45; and a pilot-operable control lever 45A. Pressure-applying conduitry 47 extends spanwise of the wing and includes, as shown, branches connected to the inlet of each of the six hydraulic cylinders 22. Outlet conduitry 48 leads from the discharge end of each cylinder 22 to the valve and thence to an outlet 49, which discharges to reservoir or an accumulator or the like.

In protracting the flaps, the operator so shifts lever 45A, in the crew's area, as to direct pressure fluid into the forward end of cylinders 22, with all parts in the positions of FIG. 3. As shown in FIG. 5, this causes the cylinders to become substantially horizontal, because of the constraining effects on its forward end of links A and bell-crank B which also causes the piston rod to swing lever 20 rearwardly and counterclockwise. By virtue of the 6-arm flap linkage system 20, 19, 39, 27, 33, 36, the rearward thrust of the piston-rod hence displaces the flap rearwardly while deflecting same to a take-off attitude. As shown in FIG. 5, for landing usage of the flap, the piston-rod is extended still further, by wider opening of the actuator valves by means of lever 45A, and the link A and bellcrank B constrain the cylinder to take up a slightly above-horizontal attitude, A and B also accommodating back thrust or reaction of the actuator and they adjust themselves, and it, thereto.

The heretofore unavoidable upward protrusion of the long links deemed essential in place of the present short links 27 and 36, due to the "jackknifing" of these links, rendering them unsuitable for thin-section wings, very thin in this trailing edge region, is thereby totally obviated, for slide block link 33, etc., transform this otherwise upward movement into a fore-and-aft movement.

By virtue of the present invention's novelties, the net effect of the aforestated motions is to bodily rearwardly displace flap 15 without effecting any great amount of downward deflection during the initial stage of movement.

Continued rearward movement of piston 24, aided by A's and B's actions, then, instead of tending to further displace the flap, brings 20 into the position shown in FIG. 4 and the upward movement of point 40, attached to the horn, rotates the flap-group to its 20° take-off downward deflection position.

Further rearward thrust of the piston rod, it reaching the rearward limit of its stroke deflects the translated flap-group downwardly into its 50° landing position, without any appreciable rearward bodily displacement of the flap, at this juncture and in about 9 seconds from its 20° "down" position to its 50° "down" position.

The device thus substantially meets the requirement of achieving "full" rotation without having to concomitantly undergo commensurate rearward displacement.

Although two fairing sections 60 and 61 are necessary—61 for the pivot-group 40 and the horn 39 and 60 to streamline 61, it is clear that nothing in the nature of the usual deep and extensive fairings is required and there are no drag-producing protuberances. The flap and operating mechanism of the present invention are thus eminently well adapted for incorporation in the trailing edge of the quite thin "high-speed" wings employed in jet propelled aircraft.

It is to be noted that many of the foregoing advantages are achieved by virtue of the fact that the essential ones of the present novel mechanisms are of six-bars, that is, are six-bar linkages. The first bar, 19, is a fixed fulcrum or abutment, but constitutes a link nonetheless. The second bar is constituted by member 20 as a whole; the third bar, by the horn 39; the fourth bar, by the member 36; the fifth bar, by the member 27; and the sixth bar is constituted by the articulated slider block 33.

An outstanding novelty of the device resides in the fact that the pivotal connection point of the flap to the upper skin and to the "walking-beam" 20 is bodily translatable, as on the track 35. This feature, in conjunction with the other novel members of the 6-bar linkage, enables the achievement of the aforestated results. However, the basal linkage is a quadrilateral system, constituted by 20, 27, 36 and 39, with 33 and 35 adjunctive thereto.

As indicated in FIGS. 6, 7 and 8, inclusive, since the trailing edge of the swept back wing lies substantially rectangularly to the fuselage in the root-section or region of the wing, whereas the remainder, or outboard, portion of the wing angles rearwardly from the root-section, the inboard and outboard flaps, in being lowered, might interfere with each other, were it not for certain provisions made by the invention to accommodate this situation.

To these ends, the outboard end-face of the inboard flap mounts two chordwise spaced brackets 52, each 52 being carried on vertical pivots 52A. One of these pivots is disposed at the forward portion of the end-face and the other pivot, at the rearward portion thereof. Medially of this end-face is a bracket 70 carried on a horizontal pivot 70A. The inboard end of the outboard flap carries corresponding support means similarly mounted and located in order to establish predetermined paths of movement of the flaps with relationship to each other in protraction and retraction, when provided with suitable interconnecting means, such as vertical pivots 50, uniting the respective front and rear brackets. This arrangement enables the inboard and outboard flaps to move closer together, spanwise, as shown in FIG. 7, when they are being lowered, which they are constrained to do because of the fact that the inboard, root portion of the wing extends rectangularly to the fuselage whereas the outboard portion of the wing is sweptback.

Thus, in lowering the flaps, the rear, or trailing, portions thereof, as shown in FIG. 7, mutually approach closer together, thus swinging 52—52 rearwardly with the pivot 50 thereas and on pivots 52A, while the forward brackets and pivots are undergoing the same sort of motions but resulting in the leading edge portions of the flaps swinging apart, spanwise.

At the same time, the brackets 70, disposed initially in a substantially horizontal plane in the medial portion of the flaps and interconnected by a horizontal pivot 53, mounted in a self aligning bushing 54, and also connected to the flaps' end-faces by horizontal pivots 70A undergo, because of the flaps' lowering action, an upward motion, so that the inboard flap 14 eventually overlaps the outboard one and forms therewith a dihedral angle of the order of 14°, as shown in FIG. 8. However, the lowered flaps naturally do not establish a dihedral angle with, or in continuation of, the wing's reference plane.

In order to facilitate this compound interrelationship of the movements of the flaps to each other in their lowering operation, the lower skin of the outboard flap, in the inboard region 80 thereof that, in the lowering operation, becomes overlapped by the outboard portion of the lower skin of the inboard flap, is devoid of stringers or other structure that would render it more or less rigid, so that it can flex upwardly in conformity with the pressure brought to bear on it by the overlapping inboard flap.

In raising the flaps, the reverse actions of course occur, as will be perceived by an inspection of the drawings.

Although certain specific geometrical shapes, particular instrumentalities and parameters have been employed for the sake of concreteness, it is to be understood that such specificity in no wise constitutes the invention itself or limits its scope other than as required by the ambit of the sub-joined claims.

I claim:

1. An airplane, comprising: a main body; a wing extending bi-laterally from said body; a flap disposed in spanwise extending adjacency to the trailing edge of said wing; and means connecting said flap to the trailing edge structure and operative to support, protract and retract said flap, said means comprising a substantially quadrilateral-articulated linkage unit, said unit including an upper pivotal connection to the trailing edge structure, said connection including a linkage member for linking the aforesaid quadrilateral articulated main linkage unit to said trailing edge structure, said linkage-member having rollable means on its upper end-portion; and a guide for said rollable means fixedly mounted to said trailing edge-structure so as to enable said connection to bodily shift fore and aft within the confines of a quite thin trailing edge upon protraction and retraction of the flap, thereby to minimize the lengths of the links in said quadrilateral articulated linkage so that it may be substantially entirely-encompassed at all times within the confines of an extremely thin, high speed wing-section.

2. An airplane, comprising: a main body; a wing extending bi-laterally from said body; a horned flap disposed in spanwise extending adjacency to the trailing edge of said wing; and means connecting said flap to the trailing edge structure and operative to support, protract and retract said flap, said means comprising a substantially quadrilateral-articulated linkage unit, said unit including an upper pivotal connection to the trailing edge structure, said connection including a linkage-member for connecting the aforesaid quadrilateral articulated main-linkage unit to said trailing edge structure, this linkage-member having rollable means on its upper end-portion; and a guide for said rollable means fixedly mounted to said trailing edge structure so as to enable said connection to bodily shift fore and aft within the confines of a quite thin trailing edge upon flap-actuation; thereby to minimize the link-lengths in said quadrilateral, articulated main linkage unit; said substantially quadrilateral linkage unit including a power-receiving link bearing four pivots, a first one of the said four pivots being on the upper wing skin structure, a second one being connected to the source of power, a third one being connected to the horn of the flap, and the fourth one of said pivots being pivotally articulated to the bodily rearwardly and forwardly translatable member aforesaid.

3. An airplane, comprising: a main body; a wing extending bi-laterally from said body, each half of said wing including an inboard portion extending substantially rectangularly to said body and an outboard portion sweptback with reference to said inboard portion, each of said portions including a flap disposed in spanwise adjacency to the trailing edge of each portion; means connecting each flap to the trailing edge ahead of it, said means being constructed and arranged to support, protract and retract said flap; and pivotal means interconnecting each inboard flap to each outboard flap in the region of the adjacent end-faces thereof, said pivotal means being arranged and constructed with reference to a predetermined path of downward movement of said flaps to effect overlap of the adjacent ends thereof in lowering said flaps.

4. An airplane, comprising: a main body; a wing extending bi-laterally from said body, each half of said wing including an inboard portion extending substantially rectangularly to said body and an outboard portion sweptback with reference to said inboard portion each of said portions including a flap disposed in spanwise adjacency to the trailing edge of each portion; means connecting each flap to the trailing edge ahead of it, said means being constructed and arranged to support, protract and retract said flap; and pivotal means interconnecting each inboard flap to each outboard flap in the region of the adjacent end-faces thereof, said pivotal means comprising a pair of vertically pivoted brackets mounted near the trailing edge and near the leading edge, respectively, of the adjacent end-faces of the inboard and outboard flaps; a vertical pivot connecting each mutually confronting pair of said brackets; a bracket horizontally pivotally mounted to each of said end faces in the medial region thereof; and a horizontally extending pivot interconnecting the last mentioned brackets.

5. An airplane, comprising: a main body; a wing extending bi-laterally from said body, each half of said wing including an inboard portion extending substantially rectangularly to said body and an outboard portion sweptback with reference to said inboard portion, each of said portions including a flap disposed in spanwise adjacency to the trailing edge of each portion; means connecting each flap to the trailing edge ahead of it, said means being constructed and arranged to support, protract and retract said flap; and pivotal means interconnecting each inboard flap to each outboard flap in the region of the adjacent end-faces thereof, said pivotal means being arranged and constructed with reference to a predetermined path of downward movement of said flaps to effect overlap of the adjacent ends thereof in lowering said flaps; said means being also arranged and constructed with reference to the adjacent flap-ends to establish a dihedral angle between said flaps in lowering same; said adjacent overlapping flap ends following interfering paths in the lowering movement; and a portion of one flap end being flexible and displaceable to accommodate the resulting interference.

References Cited in the file of this patent
UNITED STATES PATENTS

| | | |
|---|---|---|
| 2,086,085 | Lachmann | July 6, 1937 |
| 2,169,416 | Griswold | Aug. 15, 1939 |
| 2,563,453 | Briend | Aug. 7, 1951 |